United States Patent
Driver et al.

(10) Patent No.: US 6,682,668 B1
(45) Date of Patent: Jan. 27, 2004

(54) INSTALLATION OF CURED IN PLACE LINERS WITH AN ENDLESS REUSABLE INFLATION BLADDER AND INSTALLATION APPARATUS

(75) Inventors: Franklin T. Driver, St. Charles, MO (US); Charles H. Nance, Wildwood, MO (US); Richard C. Polivka, Lemont, IL (US)

(73) Assignee: Insituform (Netherlands) B.V. (NL)

( * ) Notice: Subject to any disclaimer, the term of this patent is extended or adjusted under 35 U.S.C. 154(b) by 467 days.

(21) Appl. No.: 09/637,155

(22) Filed: Aug. 11, 2000

(51) Int. Cl.$^7$ ................................ B29C 63/36
(52) U.S. Cl. ............... 264/35; 264/36.16; 264/269; 138/97; 138/98; 425/173
(58) Field of Search ............. 264/35, 516, 269, 264/36.16; 425/460, 173; 138/97, 98; 156/287, 294

(56) References Cited

U.S. PATENT DOCUMENTS

| | | |
|---|---|---|
| 4,009,063 A | 2/1977 | Wood |
| 4,064,211 A | 12/1977 | Wood |
| 4,135,958 A | 1/1979 | Wood |
| 4,366,012 A | 12/1982 | Wood |
| 4,434,115 A | 2/1984 | Chick |
| 4,456,401 A | 6/1984 | Williams |
| 4,714,095 A | 12/1987 | Muller et al. |
| 4,770,562 A | 9/1988 | Muller et al. |
| 4,778,553 A | 10/1988 | Wood |
| 4,786,345 A | 11/1988 | Wood |
| 5,044,405 A | 9/1991 | Driver et al. |
| 5,108,533 A | 4/1992 | Long, Jr. et al. |
| 5,322,653 A | 6/1994 | Muller |
| 5,388,616 A | 2/1995 | Muller et al. |
| 5,393,481 A | 2/1995 | Wood |
| 5,407,630 A | 4/1995 | Smith |
| 5,624,629 A | 4/1997 | Wood |
| 5,706,861 A | 1/1998 | Wood |
| 5,868,169 A | 2/1999 | Catallo |
| 6,117,507 A | 9/2000 | Smith |

*Primary Examiner*—Mathieu D. Vargot
(74) *Attorney, Agent, or Firm*—Reed Smith LLP; Michael I. Wolfson

(57) ABSTRACT

A process for lining an existing pipeline or conduit with a flexible resin impregnated cured in place liner by pulling in the liner and inflating it with a reusable endless inflation bladder is provided. The liner includes a resin absorbent material in tubular form with an impermeable membrane forming an outer layer. The absorbent material is saturated with a thermoset resin and pulled into the existing conduit. A flexible inflation bladder maintained on a inflation bladder spool is everted into the collapse liner which is then forced against the interior surfaces of the existing conduit, allow to cure and the bladder removed and rewound on the spool. When the everting and curing fluid is hot water, the hot water is removed and stored for reuse as the inflation bladder is withdrawn.

28 Claims, 8 Drawing Sheets

INSTALLATION OF CURED IN PLACE LINERS WITH AN ENDLESS REUSABLE INFLATION BLADDER AND INSTALLATION APPARATUS

BACKGROUND OF THE INVENTION

This invention relates to a method for installation of a cured in place liner into an existing conduit by pulling in and inflating the liner and more particularly to a method of trenchless rehabilitation of an existing conduit by pulling into the existing conduit a resin impregnated liner and everting a reusable inflation bladder into the liner and to the apparatuses for practicing the method.

It is generally well known that conduits or pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipe. Alternatively, the leakage may be outward from the conducting portion of the pipe into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles or similar natural or man made vibrations, or other such causes. Regardless of the cause, such leakages are undesirable and may result in waste of the fluid being conveyed within the pipeline, or result in damage to the surrounding environment and in a possible creation of a dangerous public health hazard. If the leakage continues it can lead to structural failure of the existing conduit due to loss of soil and side support of the conduit.

Because of ever increasing labor and machinery costs, it is increasingly more difficult and less economical to repair underground pipes or portions that may be leaking by digging up and replacing the pipes. As a result, various methods had been devised for the in place repair or rehabilitation of the existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process and is described in U.S. Pat. Nos. 4,009,063, 4,064,211 and 4,135,958, the contents of all of which are incorporated herein by reference.

In the standard practice of the Insituform Process an elongated flexible tubular liner of a felt fabric, foam or similar resin impregnable material with an outer impermeable coating and has been impregnated with a thermosetting curable resin is installed within the existing pipeline. Generally, the liner is installed utilizing an everting process, as described in the later two identified Insituform patents. In the eversion process, radial pressure applied to the interior of an everted liner presses it against and into engagement with the inner surface of the pipeline. However, it is also practiced by pulling the impregnated liner into the conduit by a rope or cable and using a separate fluid impermeable inflation bladder or tube that is everted within the liner to cause the liner to cure against the inner wall of the existing pipe. Such resin impregnated liners are generally referred to as cured-in-place-pipes or "CIPP liners" and the installation of the CIPP liners is referred to a CIPP installation.

The CIPP flexible tubular liners have a smooth layer of relatively flexible, substantially impermeable polymer layer coating the outside of the liner in its initial state. When everted this impermeable layer ends up on the inside of the liner after the liner is everted during installation. As the flexible liner is installed in place within the pipeline, the pipeline is pressurized from within, preferably utilizing a fluid such as water to force the liner radially outwardly to engage and conform to the interior surface of the existing pipeline. The resin which has been impregnated to the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When the tubular liners are installed by pull in and inflate, the liner is impregnable and positioned within the existing pipeline in a collapsed state. A down tube, inflation pipe or conduit having an elbow at the lower end typically is positioned within an existing manhole or access point and an everting bladder is passed through the down tube, opened up and cuffed back over the mouth of the horizontal portion of the elbow. The collapsed liner within the existing conduit is then positioned over and secured to the cuffed back end of the inflation bladder. An everting fluid, such as water is then fed into the down tube and the water pressure causes the inflation bladder to push out of the horizontal portion of the elbow and cause the collapsed liner to expand against the interior surface of the existing conduit. The eversion of the inflation bladder continues until the bladder reaches and extends into the down stream manhole or second access point. At this time the liner pressed against the interior surface of the existing conduit is allow to cure. Typically, cure is initiated by introduction of hot water into the inflation bladder which is circulated to cause the resin in the impregnated liner to cure.

After the resin in the liner cures, the inflation bladder may be removed or left in place in the cured liner. If the inflation bladder is to be left in place, the bladder will generally be one that has a relatively thin resin impermeable outer layer after eversion to cause the bladder to adhere to the resin impregnated layer of the liner as is well known in the art. At this time, entry into the manhole or access point is required to open the liner to release the water used to inflate the bladder and to cut off the ends extending into the manholes. When the inflation bladder is to be removed, it may be removed by pulling on a holdback rope attached to the trailing end of the inflation bladder which is used to control the speed of the eversion. This is generally done after puncturing the bladder to release the water used to evert the bladder and initiate the resin cure. Finally, the down tube can then be removed and service can be reconnected through the lined pipeline. If intersecting service connections are present, they would be reopened prior to resumption of service through the lined pipeline.

When a cured in place liner is installed using the pull in and inflate method, the outer impermeable layer of the liner remains pressed against the interior surface of the existing conduit. Certain advantages may be attained by this method of installation because the resin in the resin impregnable layer of the liner is trapped between two impermeable layers, namely the outercoating and the inflation bladder, so that there is little or no resin migration out of the liner. Additionally, in a pull in and inflate installation, the liner coating need not be as strong as required in an installation by eversion, because the coating is not subjected to the pressure head require to evert the liner using the eversion process and does not come into contact with hot fluid circulation during the resin cycle. Thus, the liner tends to be of more uniform thickness in a pull in and inflate using an inflation bladder cured in place process compared to when the liner itself is everted.

While the pull in and inflate method has these advantages, the installation process is somewhat more complex. It requires banding the inflation bladder to the down tube elbow and banding the collapsed liner already positioned in the existing pipeline to the down tube. This requires work within a restricted manhole space. Additionally, at the end of the installation, the inflation bladder may need to be removed after being cut at the distal end to release the inflation fluid. Finally, different length bladders must be used for a different length conduits.

While the pull in and inflate method does have various advantages, the shortcomings tend to increase the labor costs which are a significant aspect of the installation process. Accordingly, it is desirable to provide a rehabilitation method using a pull in and inflate liner installation method which is more efficient economically than the methods currently practiced.

SUMMARY OF THE INVENTION

Generally speaking, in accordance with the invention, a method of rehabilitation of an existing pipeline by pull in and inflate installation of cured in place liners using a reusable inflation bladder is provided. The liner arriving on the job site may be in a length in excess of the single section to be lined. It is pulled into the existing conduit and cut at the ends to extend into both manholes. An inflation bladder in a length at least as long as the pipeline to be lined and a flexible starter sleeve preattached to an inflation elbow are lowered into one manhole, placed into the collapsed liner and everted. After the resin in the liner is cured, the inflation bladder is retracted, stored and available for reuse in the next installation. The bladder may be conveniently stored and rewound on an inflation bladder spool and is withdrawn from the cured liner by a power spool. In a preferred embodiment of the invention, the heated water in the inflation bladder is pumped out of the bladder through the elbow as the bladder is withdrawn and recycled for reuse.

In preferred embodiments of the invention, an easement vehicle carries a spooled inflation bladder to the upstream access and includes a three way valve for applying pressurized fluid to the everting inflation bladder for inflation and curing of the liner and removed of the fluid after cure. In the most preferred aspect of the invention, the inflation fluid is heated water which is inserted to the inflation bladder at an elbow at the access to the existing pipeline. After cure and when the inflation bladder is rewound on the inflation bladder reel, the heated water is returned into the water inlet and pumped into the hot water storage maintained above ground level. This allows for the easy reuse of the inflation bladder and conserves energy by reusing the heated water used to cure the liner.

Accordingly, it is the object of the invention to provide an improved method for rehabilitation of an existing pipeline by the installation of a cured in place liner by the pull in and inflate method utilizing an endless inflation bladder.

It is another object of the invention to provide an improved method for pull in and inflate installation of a cured in place liner by providing an endless inflation bladder mounted on a bladder reel.

It is a further object of the invention to provide an improved method of installation of a cured in place liner by pull in and inflate wherein heated water used to inflate and cure the liner is withdrawn for reuse as the inflation bladder is removed.

It is still another object of the invention to provide an improved easement unit including an inflation bladder reel for storing inflation bladder to be used in the pull in and inflate installation method.

It is yet another object of the invention to provide an improved easement unit for use in the installation of cured in place liner by the pull in and inflate method including a three way valve for introducing heated water for eversion and cure of the liner and for removal of the heated water after cure when the inflation bladder is withdrawn.

It is yet another object of the invention to provide continuous circulation of the hot water to the easement unit to assure that the hot water pumped into the inflation bladder will be at the proper temperature even when the easement unit is remote from the hot water supply unit.

Still other objects and advantages of the invention will impart the obvious and impart the apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, references had to the following description taken in connection with the accompanying drawings in which.

DESCRIPTION OF THE PREFERRED EMBODIMENTS

Figure 1:
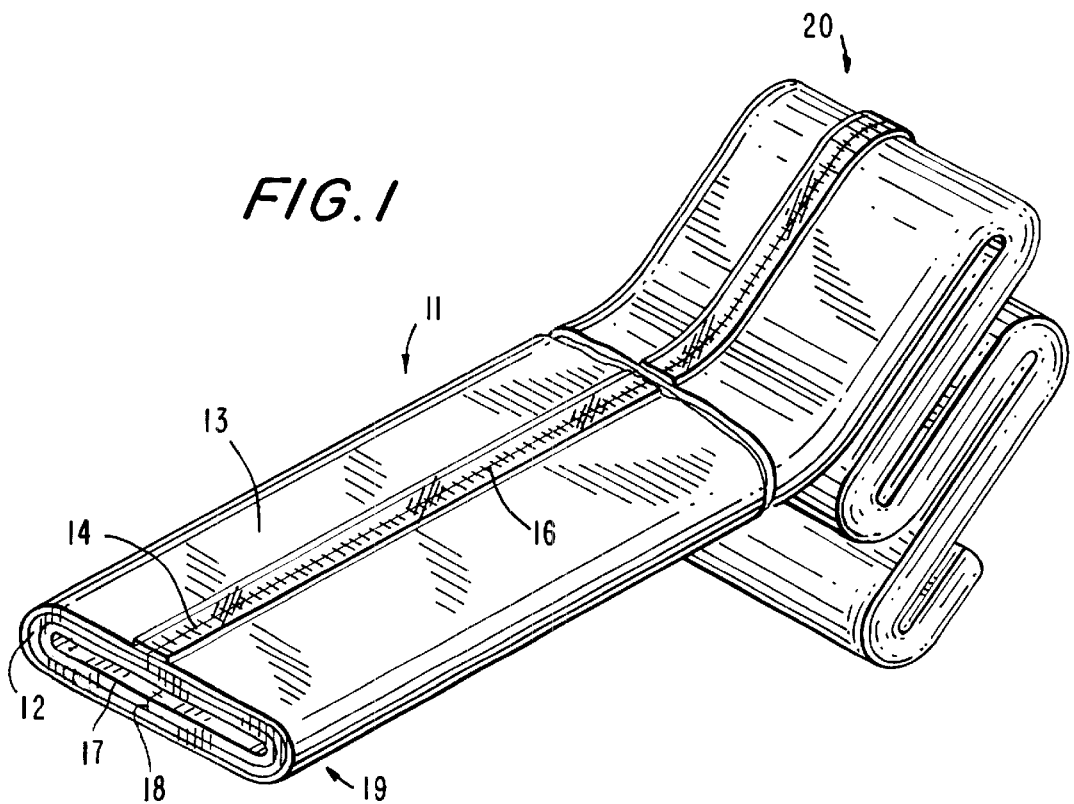
FIG. 1 is a perspective view of a length of a typical resin impregnable cured in place liner suitable for use in lining an existing pipeline in accordance with the invention.
Figure 1A:
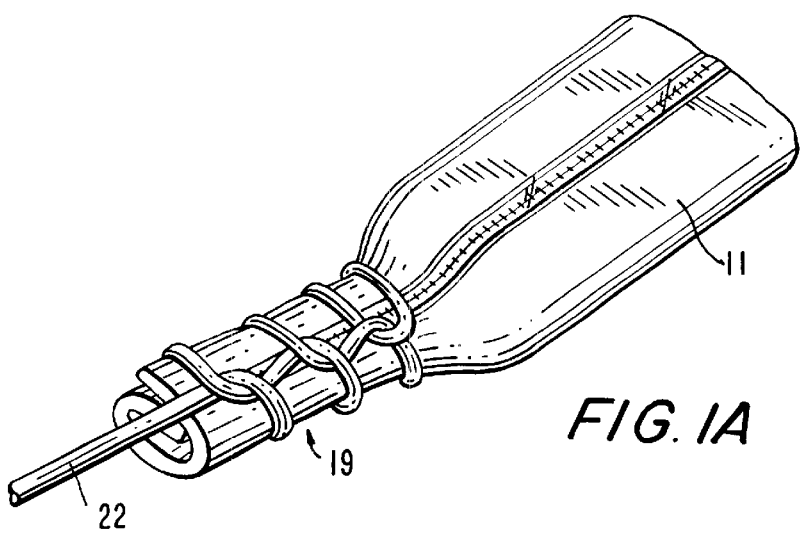
FIG. 1A is a perspective view of the liner of FIG. 1 with the leading end folded with a cable secured to it for pulling the liner into the existing pipeline.

FIG. 1 illustrates a flexible cured in place liner 11 of the type generally well known in the art. Liner 11 is formed from at least one layer of a flexible resin impregnable material, such as a felt layer 12 having an outer impermeable polymer film layer 13. Felt layer 12 and film layer 13 are stitched along a seam line 14 to form a tubular liner. A compatible thermoplastic film in a form of a tape or extruded material 16 is placed or extruded over seam line 14 in order ensure the impermeability of liner 11. In the embodiment illustrated in FIG. 1 and used throughout this description, liner 11 includes an inner second felt layer 17 also stitched along a seam line 18 which is positioned at a point in the tube other than the location of seam line 14 in outer felt layer 12. Liner 11 has a leading end 19 with a continuous length 20 stored in a refrigerated unit 21 (FIG. 2) to suppress early cure of resin and is cut to a desired length after being pulled into the existing pipeline. FIG. 1A shows a winch rope or cable 22 secured by a slip knot and three half hitches for pulling liner 11 into the pipeline. End 19 and cable 22 may be duct taped to prevent slip and seal the end of liner 11.

Figure 2:
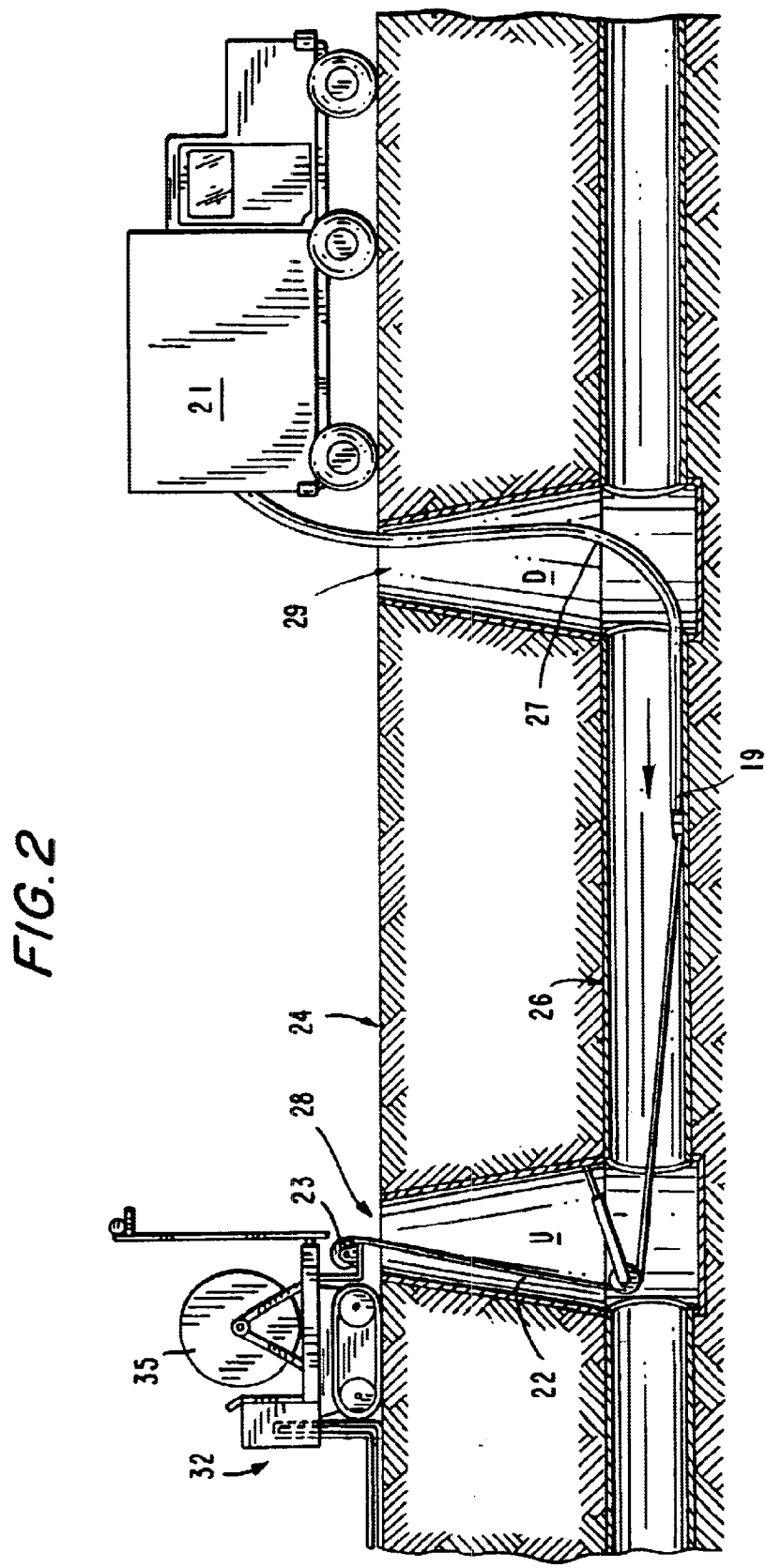
FIG. 2 is a cross-sectional elevational schematic view showing pulling in of a resin impregnated cured in place liner of the type illustrated in FIG. 1 from a downstream manhole to an upstream manhole at the start of the installation process to line an underground conduit.

For larger liner diameters, several layers of felt material may be used. Felt layers 12 and 17 may be natural or synthetic flexible resin absorbable material, such as polyester or acrylic fibers. Impermeable film 13 in outer layer 12 may be a polyolefin, such as polyethylene or polypropylene, a vinyl or a polyurethane as is well known in the art. In the initial step in all trenchless rehabilitation installations, the existing pipeline is prepared by cleaning and videotaping. Referring to FIG. 2, an existing pipeline 26 in need of repair is shown below a surface 24 with a first access opening 28 at an upstream manhole U and a second access opening 29 or at a downstream manhole D. Of course, the installation and steps to be described can be done at either end of pipeline 26. A conventional jetter is used to pull in winch cable 22 into the pipeline. Cable 22 is then connected to leading end 19 of liner 11 as shown in FIG. 1A. Liner 11 is pulled in by a winch 23 positioned on surface 24 at opening 28 from the refrigeration unit 27 positioned at a downstream manhole opening 29.

Prior to commencing installation pursuant to the method to be described, a curable thermosetting resin is impregnated to felt layers 12 and 17 pursuant to a process generally known as "wet-out". The wet-out process generally involves injecting resin into liner 11 through an opening in impermeable film layer 13, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin which is relatively stable at room temperature, but cures when warmed by hot water.

Referring again to FIG. 2, when existing pipeline or conduit 26 below surface 24 is not sound, it is desirable to use one of the accepted rehabilitation methods, such as lining with a resin impregnated cured in place flexible liner 27 having a construction as illustrated in FIG. 1. In the CIPP pull in and inflate process of the type utilized in accordance with the invention, a resin impregnated liner 27 is pulled into existing conduit 26 from downstream access opening 29 through downstream manhole D to second access opening 28 at an upstream manhole U by a rope or pull cable 22 connected to winch 23 on surface 24. Winch 23 may be a stand alone unit or be positioned on a vehicle such as an easement unit 32. In the illustrated embodiment shown in FIG. 2, winch 23 is mounted on easement unit 32 which includes additional apparatuses such as bladder spool 35 including an endless length of inflation bladder used in the installation process that will be described in much greater detail below.

Figure 3:
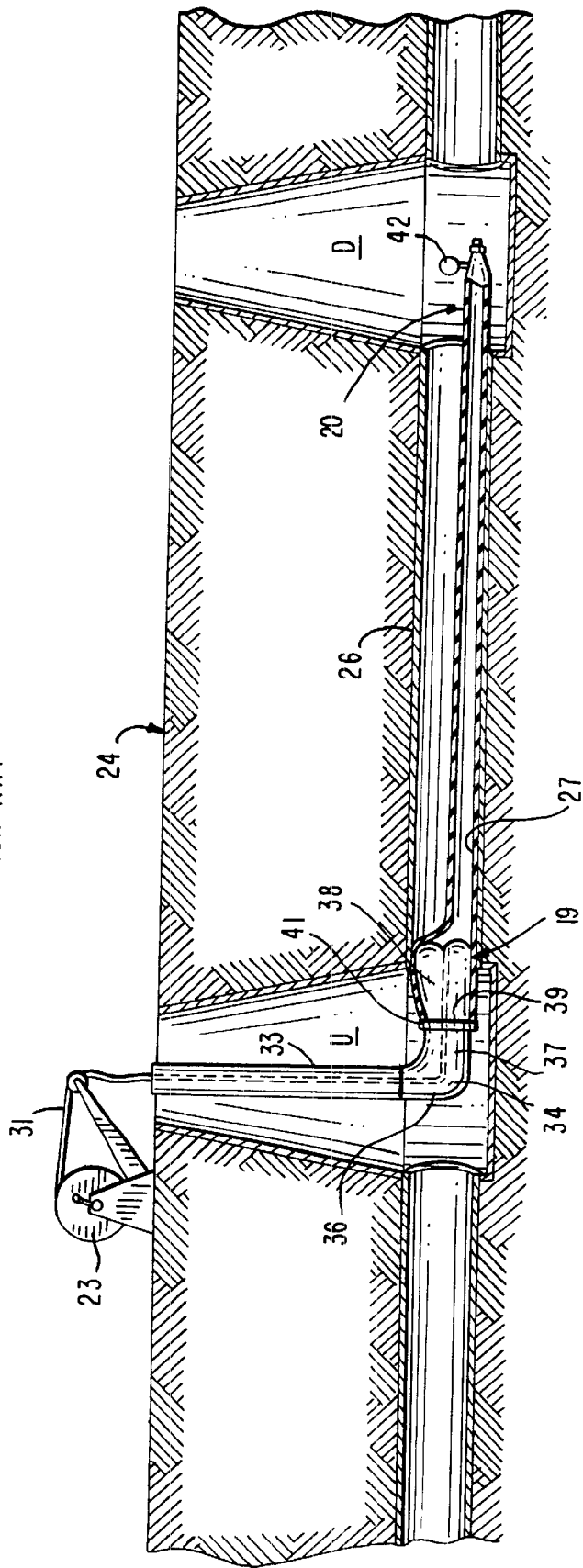
FIG. 3 is a cross-sectional elevational schematic view as in FIG. 2, wherein an inflation bladder is positioned within the collapsed cured in place liner position within the existing conduit at the upstream manhole in accordance with the prior art.

Referring now to FIG. 3, resin impregnated liner 27 is pulled into existing pipeline 26 and it is positioned within the portion of pipeline 26 to be relined. In the conventional pull in and inflate installation process, a down tube or eversion pipe 33, configured to have a rigid tubular elbow 34 having a vertical leg 36 and a horizontal leg 37, is introduced into upstream manhole U. A flexible fluid impermeable inflation bladder 38 having a leading or free end 39 is passed down eversion pipe 33 through elbow 34 and free end 39 is attached to horizontal leg 37 of elbow 34. Only, only the connected leading end 39 of inflation bladder 38 was originally turned over outwardly to form a band position 41. In the conventional pull in and inflate installations' end 19 of impregnated liner 27 is then also positioned over banded position 41 of bladder 38 and itself banded to horizontal leg 37 of elbow 34. As a result of water pressure fed into eversion pipe 33, inflation bladder 38 events. This causes inflation bladder 38 gradually and progressively to extend from horizontal leg 37 within liner 27. In order to maintain the pressure, it is necessary to maintain the height of the water column within eversion pipe 33.

Generally, an outlet valve 42 is provided at trailing end 20 of impregnated liner 27 for letting air present in the interior of liner 27 escape as everting inflation bladder 38 advances through the interior liner of 27. After liner 27 has been fully shaped, the resin is hardened by exposing it to heat. This is usually accomplished by introducing heated water into eversion pipe 33 or circulating hot water through a hose pulled into the everting bladder by a hold back rope connected to the trailing end of the everting bladder.

If inflation bladder 38 is to remain in cured liner 27 after installation, it would generally be formed with felt material on the surface facing the interior of liner 27. After cure, the ends extending into manholes U and D are cut-off. Alternatively, inflation bladder 38 may be removed from the interior of cured liner 27. In this case, generally a hole is formed in liner 27 and bladder 38 in downstream manhole D to release the water after cure so that bladder 38 may be readily removed by the holdback rope which was used to control the everting speed of inflation bladder 38. Following removal of inflation bladder 38, ends 19 and 20 extending into manholes U and D are trimmed, and eversion pipe 33 is removed from upstream manhole U. Installation in this manner has required entry into manhole U in order to secure liner 27 about the end of horizontal leg 37 of eversion pipe 33. Similarly, entry into downstream manhole D is necessary to release the heated water after cure prior to removal of inflation bladder 33.

Figure 4:
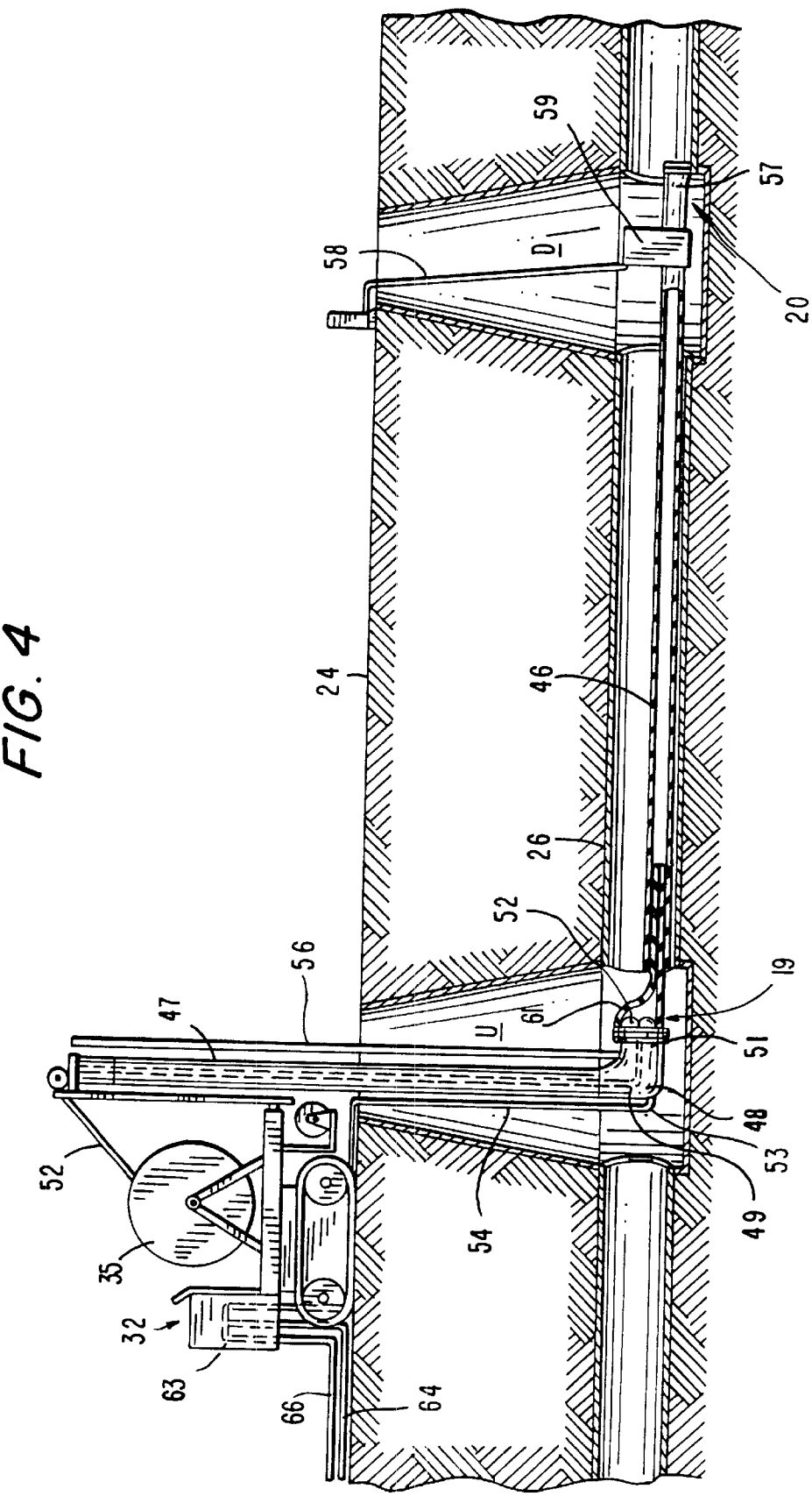
FIG. 4 is a cross-sectional elevational view as in FIGS. 2 and 3, showing the start of eversion of the inflation bladder and expansion of the liner within the existing conduit.

Referring now to FIG. 4, installation of a resin impregnated liner 46 of the type illustrated in FIG. 1 using an improved pull in and inflate method in accordance with the invention is illustrated. The elements of liner 46 are identified by the same reference numerals as used in connection with liner 11 in FIG. 1. Here, liner 46 is pulled into existing pipeline 26 requiring repair from downstream manhole D to upstream manhole U in the same manner as described in connection with FIG. 3. Once liner 46 is in place, a down tube 47 connected to an elbow 48 at a vertical section 49 and having a horizontal section 51 with an inflation bladder 52 secured to horizontal section 51 is inserted into upstream manhole U.

Figure 8:
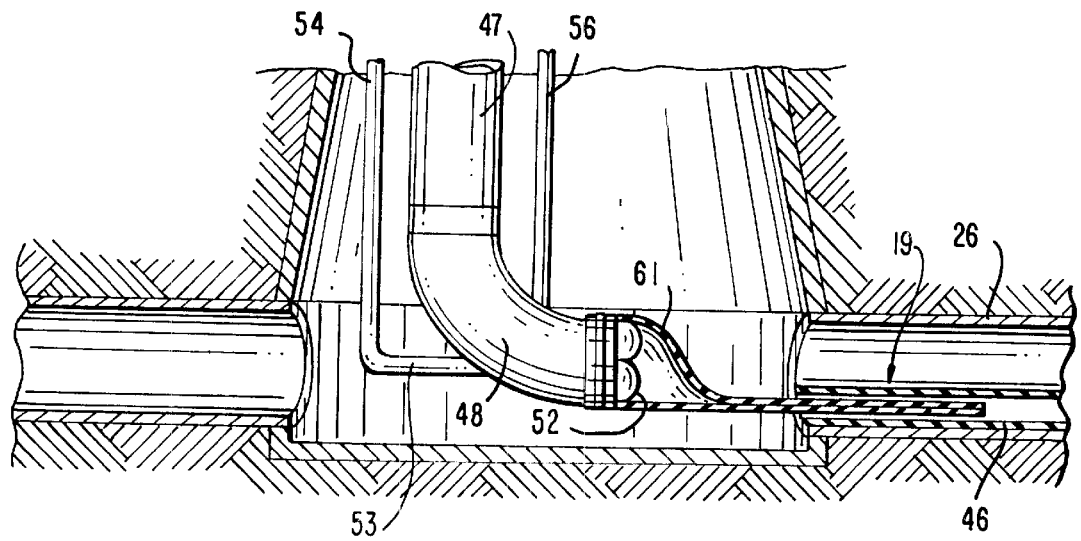
FIG. 8 is an elevational view showing a starter sleeve constructed and arranged in accordance with the invention installed on a down tube elbow prior to the start of eversion for use in accordance with the invention.
Figure 9:
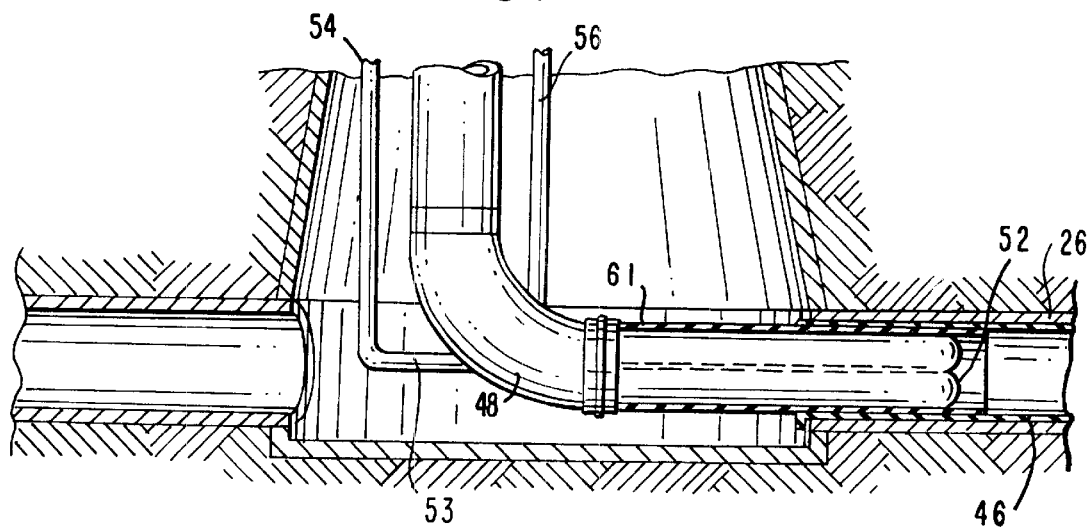
FIG. 9 is a view of the elbow and starter sleeve of FIG. 8 after the start of the eversion in accordance with the invention.

In the preferred embodiment of the invention illustrated in FIG. 4, elbow 48 is fitted with a flexible starter sleeve 61. Starter sleeve 61 is a length of about two feet of flexible robust tubular material. It is sufficiently flexible enough so then when not supported it will generally lay flat. When attached to horizontal position 51 of elbow 48, distal end of starter sleeve 61 lies flat as illustrated in FIG. 8. This flattened end of starter sleeve 61 is then inserted into end 19 of liner 46 so that end 19 of liner 46 overlaps starter sleeve 61 by at least about 3–6 inches. Care is taken to maintain starter sleeve 61 flat about the end of bladder 52 to avoid introduction of air into liner 46. FIG. 9 shows the position of these elements after start of the eversion of bladder 52.

Inflation bladder 52 is formed of a woven scrim having a thermoplastic coating on both surfaces. The thermoplastic coating is selected to be releasable from a cured thermoset resin used in the liner. Polyvinyl chloride has been found to be fully suitable for this use, although a wide variety of thermoplastic coatings would be suitable. As is well known in the trenchless rehabilitation art, a bladder can be fabricated by forming a tube out of a piece of flat flexible material stitched or heat sealed to form a tube. In the case of a seam line, an impermeable tape placed over the seam line so that the tubular bladder is water-tight.

The bladder material is selected to have greater elongation at break in the weft direction than in the warp direction. Preferably, the elongation at break in the weft direction is about twice that of elongation at break in the warp direction. In the most preferred embodiment of the invention, a bladder material is selected to have an elongation at break in the weft direction between about 70 to 90% and an elongation at break in the warp direction between about 30 and 40%.

This increased elongation in the weft direction allows for radial expansion of the bladder during inflation thereby forcing the liner to conform closely to the interior configuration of the existing pipeline. Additionally, this will aid in the formation of dimples at the intersection of laterals with the pipeline being lined.

Figure 5:
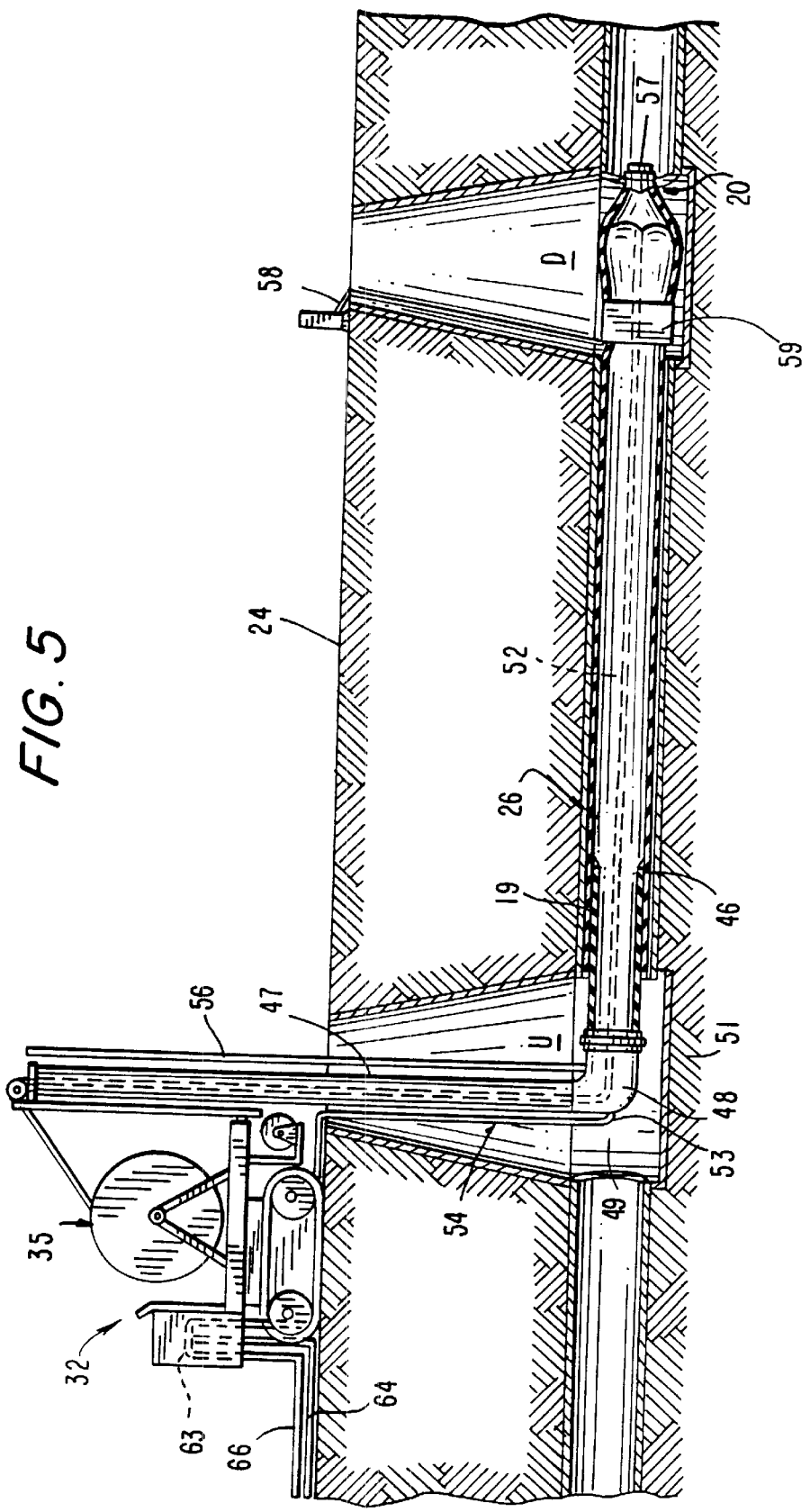
FIG. 5 is a cross-sectional elevational schematic view as in FIGS. 2–4, showing completion of the eversion of the inflation bladder and cure of the liner.

Referring now to FIG. 5, elbow 48 is substantially rigid and is formed with an inlet port 53 for receiving eversion fluid fed by a heated water inlet line 54. In the illustrated embodiment, elbow 48 also includes a vertical sight tube 56 extending above ground surface 24 in order to determine accurately the level of fluid within down tube 47 and thus the pressure exerted on everting inflation bladder 52.

An air vent 57 is provided at a end 20 of liner 46 within downstream manhole D. In order to observe the progress of the cure of the resin in liner 46, a thermocouple 58 is attached to end 20 of liner 46 which is passed through a sample mold 59 in downstream manhole D.

Figure 7:
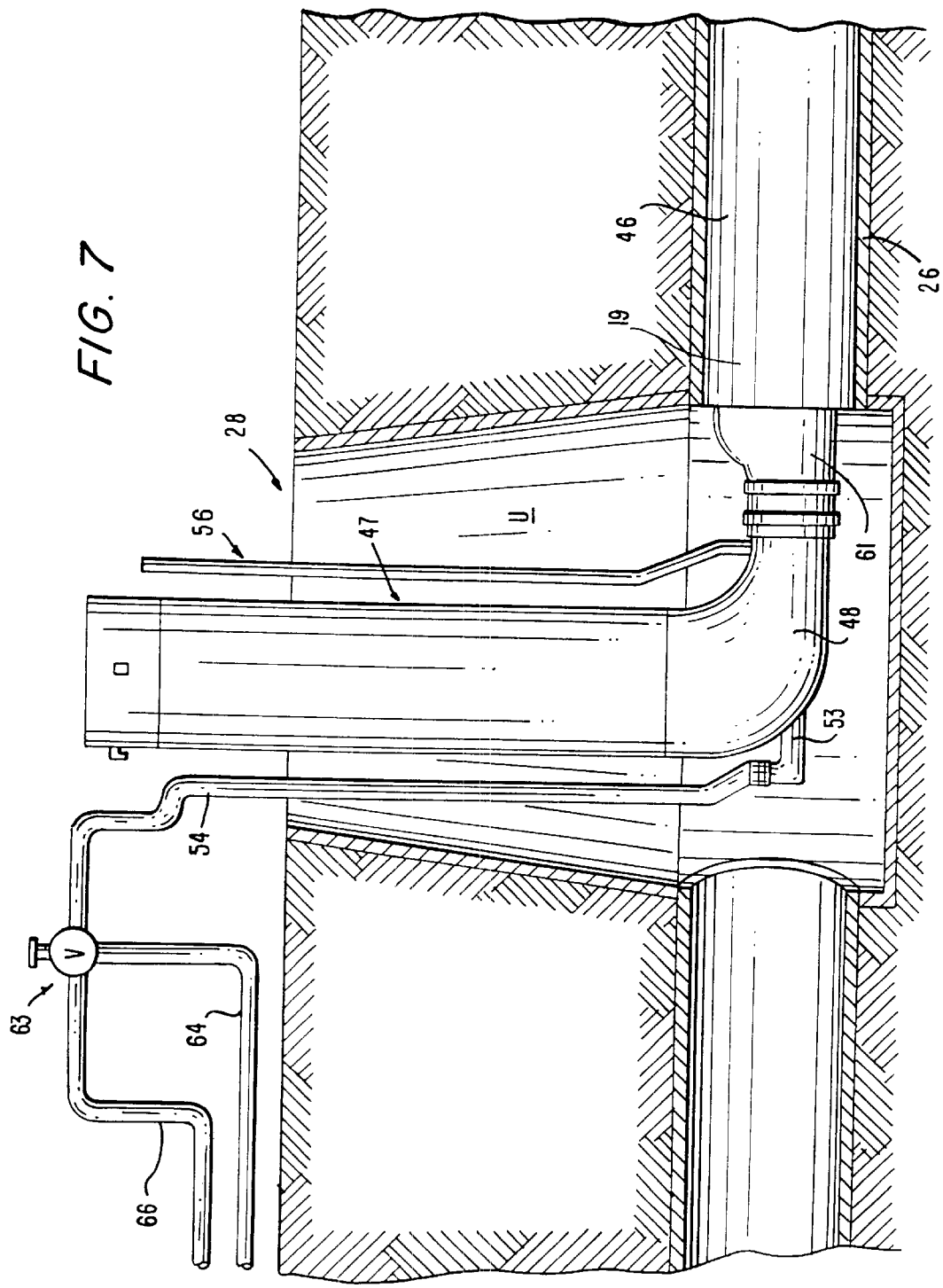
FIG. 7 is a detailed sketch of a three way valve suitable for use with an easement unit constructed and arranged in accordance with the invention for use in the installation process depicted in FIGS. 2–6.

At this time, inflation of liner 46 can begin. Inflation bladder 52 is everted through starter sleeve 61 by adding water or other eversion fluid at inlet 53 of elbow 48. In the preferred embodiment being describe, the eversion fluid is hot water introduced through heated water inlet line 54 from a boiler connected by heated water supply line 64 through a 3-way valve 63 shown in detail in FIG. 7. As inflation bladder passes through starter sleeve 61 and enters liner 46, starter sleeve 61 is locked in against pipeline 26 thereby locking elbow 48 in place in manhole U. Inflation bladder 52 continues to evert through liner 46 until it is brought to rest at end 20 of liner 46. The positioning of elements at this point is illustrated more clearly in FIG. 5.

Because eversion fluid is introduced into inflation bladder 52 at elbow 48 and a recirculation hose is not connected to everting bladder 52 liner 46 is positioned within existing pipeline 26 in its proper position, at the time eversion of bladder 52 starts. Thus hot water introduced into elbow 48 can immediately cause initiation of the cure of resin in impregnated liner 46 as soon as it is contacted by everting inflation bladder 52. The net result of this is to eliminate heat up of inversion water and initiate the cure at the earliest time possible so that the overall installation and cure cycle is reduced substantially. The progress of the cure is observed by temperature readings at thermocouple 58. At this time, the resin in liner 46 is allowed to cure in accordance with the previously determined specifications for the resin selected. The pressure within inflation bladder 52 is maintained by regulating the pressure head in eversion down tube 47 and readings on thermocouple 58.

When the resin cure is complete, prior art techniques will generally call for cutting the ends 19 and 20 of liner 46 extending into manholes U and D and allowing the curing water to proceed downstream within the sewer system. However, recently, there is generally more concern about the chemical components present in the curing water, such as styrene derivatives and the release of hot water into the sewer system. Accordingly, there is increasing environmental resistance to proceeding in this conventional manner of cutting ends 19 and 20 of liner 46 to release the curing fluid.

Figure 6:
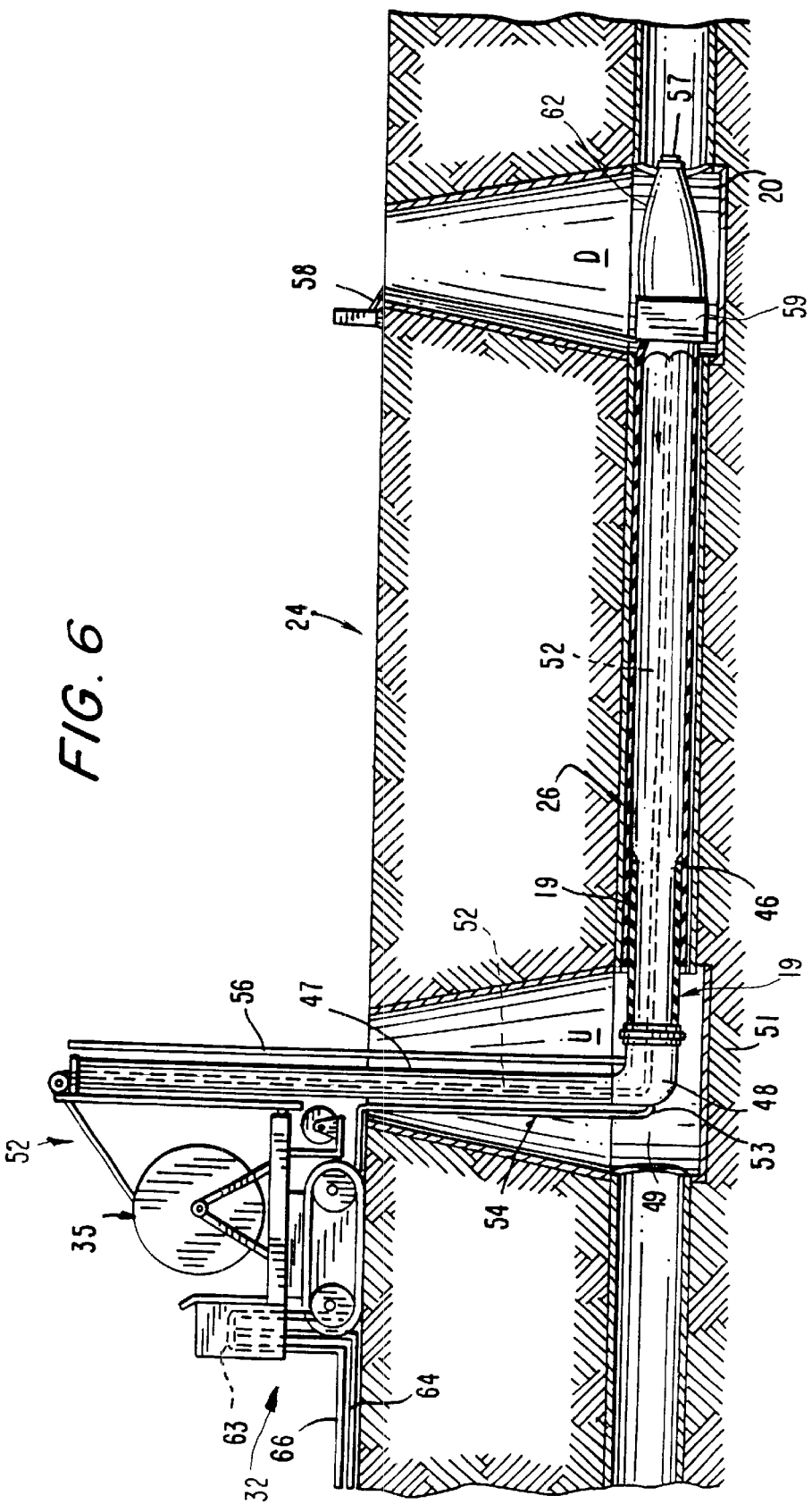
FIG. 6 is a cross-sectional elevational view as in FIGS. 2–5, showing removal of the reusable inflation bladder and recycle of the inflation hot water after cure in accordance with the invention.

In order to overcome this as well as provide additional energy savings and water saving, it is contemplated in accordance with the invention that the heated water used for inflation and initiating the cure will be recovered and recycled for use in the next eversion. In order to accomplish this, as shown in FIG. 6, inflation bladder 52 is not cut, but the hot everting fluid is removed through heated water inlet line 54 and recycled to a boiler storage tank. As the de-eversion of inflation bladder 52 commences, a vent hole 62 is formed at distal end 20 of cured liner 46 in downstream manhole D to prevent creating a vacuum. A 3-way valve 63 located in this case on easement unit 32 is set to connect heated water inlet line 54 to a hot water return line 66. Once the de-everting inflation bladder 52 is fully de-everted, it is removed from upstream manhole U. This removal is simplified by merely lifting and removing down tube 47 with elbow 48 and attached starter sleeve 61 which easily withdraws from end 19 of liner 46 without the need to enter manhole U. This is due to the fact that upstream end 19 of liner 46 is not banded to horizontal end 51 of elbow 48. Starter sleeve 61 merely slips out from within end 19 of liner 46.

Once all heated water has been pumped from cured liner 46, man entry into manhole D is extremely safe. Accordingly, end 20 of liner 46 manhole D can be safely cut. During the de-eversion, inflation bladder 52, is rewound on spool 35 on easement unit 32 for ease of storage and reuse during a subsequent eversion.

Inflation bladder 52 is formed from an elastomeric material which is not self-containing. It generally stretches in the radial direction which provides for improved expansion of liner 46 during eversion and generally stiff and non-elastic in the longitudinal direction. This permits control of inflation rate by maintaining the tension on the bladder as it unreels from spool 35. Bladder 52 may be formed of a wide variety of materials, such as silicone or polyvinyl chloride coated on a scrim which may reinforced by fibers or filaments.

It will thus be seen that the objects set fort above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method for trenchless rehabilitation of an existing pipeline by pulling a flexible resin impregnated liner into the existing pipeline from a first access opening to a second access opening and everting a flexible inflation bladder into the pulled in liner to conform the liner to the existing pipeline and curing the resin in the liner, comprising:

providing a supply of flexible resin impregnated liner in a length in excess of the pipeline to be repaired;

pulling the leading end of the flexible liner into the pipeline from one of the access opening to the other access opening with the leading end extending beyond the end of the pipeline in the second access opening and cutting the liner to extend a desired length into the first access opening;

providing a downtube and elbow apparatus having a tubular portion and a rigid elbow portion, the tubular portion of sufficient length to provide a required pressure head for everting a flexible inflation bladder;

providing a supply of flexible inflation bladder in a length in excess of the pipeline to be repaired and feeding the inflation bladder through the tubular portion of the downtube and elbow apparatus and turning back the end of the inflation bladder about the elbow and securing the bladder thereto;

securing a length of flexible starter sleeve about the secured bladder at the end of the elbow;

positioning the downtube and elbow apparatus with attached inflation bladder and starter sleeve at one end of the liner in one access opening facing the end of the liner;

placing the flexible starter sleeve into the end of the liner extending into the first access opening now the proximal opening;

introducing an eversion fluid into the bladder at the elbow to force the bladder out from of the elbow and into the interior of the flexible liner;

controlling the speed of eversion of the bladder into the liner by the introduction of eversion fluid and tension maintained on the bladder until the progressively everting bladder extends to the opposite end of the flexible liner into the other access opening, now the distal opening;

allowing the resin in the liner to cure;

removing the inflation bladder and the eversion fluid from the interior of the bladder as the bladder is de-everted and recovering the eversion fluid for reuse and storing the bladder for reuse; and removing the end of the cured liner extending beyond the length of the pipeline to be repaired into the distal access opening.

2. The method for trenchless rehabilitation of claim 1, including the step of introducing a heated eversion fluid into the elbow to force the bladder out of the elbow and initiate the cure of the resin.

3. The method for trenchless rehabilitation of claim 1, wherein the heat eversion fluid is heated water stored in a boiler.

4. The method for trenchless rehabilitation of claim 1, wherein the supply of flexible resin impregnated liner is impregnated to the leading end of the liner, sealed for insertion into the existing pipeline and cut after insertion, whereby a continuous length of impregnated liner can be utilized for successive installations.

5. The method for trenchless rehabilitation of claim 1, wherein the supply of flexible inflation bladder is stored on a spool that is unwound during eversion and rewound during removal from the cured liner, whereby the downtube and elbow apparatus with secured bladder can be reused without resecuring the bladder thereto and subsequent installations.

6. The method for trenchless rehabilitation of claim 1, further including the step of providing a vent in the liner extending into the distal opening to allow for any air trapped in the liner to escape as the bladder inflates.

7. The method for trenchless rehabilitation of claim 1, further, after allowing the resin to cure, including the step of making an opening in the end of the liner extending into the distal opening to insure that a vacuum does not form in the liner as the bladder is de-everted.

8. The method for trenchless rehabilitation of claim 1, further including the step of maintaining a constant pressure head on the expanding bladder as the bladder inflates.

9. An elbow and starter sleeve assembly for use in the installation of a flexible cured in place liner in an existing pipeline, comprising:

a substantially rigid tubular elbow having an inlet leg and an outlet leg substantially perpendicular to each other, a flexible tubular bladder fed through the inlet leg to the outlet leg and folded back over the outlet leg, and a flexible starter sleeve secured to the folded over bladder at the outlet leg whereby the assembled elbow and starter sleeve is adapted to be positioned at one end of the liner for insertion of the starter sleeve into the liner prior to the eversion of the bladder.

10. The assembly of claim 9, wherein the elbow includes an eversion fluid inlet port for receiving eversion fluid to evert the bladder through the starter sleeve into the liner.

11. The assembly of claim 9, further including a down tube secured to the inlet leg of the elbow and a sight tube filled to the elbow to allow viewing the level of fluid in the down tube and bladder.

12. A method for trenchless rehabilitation of an existing pipeline by inserting a flexible resin impregnated liner into the existing pipeline from an access opening and everting a flexible inflation bladder into the inserted liner to conform the liner to the existing pipeline and curing the resin in the liner, comprising:

providing a supply of flexible resin impregnated liner in a length at least equal to the length of the portion of pipeline to be repaired;

inserting the flexible liner into the pipeline from the access opening;

providing an eversion apparatus having an outlet opening sufficient to provide a required pressure head for everting a flexible inflation bladder;

providing a supply of flexible inflation bladder in a length at least equal to the length of the portion of pipeline to be repaired and feeding the inflation bladder through the eversion apparatus outlet opening and turning back the end of the inflation bladder about the apparatus outlet opening and securing the bladder thereto;

securing a length of flexible starter sleeve about the secured bladder at the eversion apparatus outlet opening;

positioning the eversion apparatus with attached inflation bladder and starter sleeve in the access opening facing the end of the liner;

placing the flexible starter sleeve into the end of the liner;

introducing an eversion fluid into the bladder to force the bladder out from of the eversion apparatus outlet opening through the starter sleeve and into the interior of the flexible liner;

controlling the speed of eversion of the bladder into the liner by the rate of introduction of eversion fluid and tension maintained on the bladder until the everting bladder extends to the opposite end of the liner;

allowing the resin in the liner to cure; and removing the inflation bladder and storing the bladder for reuse.

13. The method for trenchless rehabilitation of claim 12, including the step of introducing a heated eversion fluid into the bladder to force the bladder out of the eversion apparatus outlet opening and initiate the cure of the resin.

14. The method for trenchless rehabilitation of claim 12, wherein the heated eversion fluid is hot water.

15. The method for trenchless rehabilitation of claim 12, wherein the supply of flexible resin impregnated liner is impregnated to a leading end of the liner, sealed for insertion into the existing pipeline and cut after insertion, whereby a continuous length of impregnated liner can be utilized for successive installations.

16. The method for trenchless rehabilitation of claim 12, wherein the supply of flexible inflation bladder is stored on a spool that is unwound during eversion and rewound during removal from the cured liner.

17. The method for trenchless rehabilitation of claim 12, wherein the eversion apparatus having an outlet opening includes an elbow having a vertical section and a horizontal section, and the inflation bladder is fed through the elbow and turned back over the end of the horizontal section of the elbow and secured thereto.

18. The method for trenchless rehabilitation of claim 12, wherein the supply of flexible inflation bladder is stored on a spool that is unwound during eversion and rewound during removal from the cured liner whereby the apparatus with secured bladder can be reused without resecuring the bladder thereto for subsequent installations.

19. The method for trenchless rehabilitation of claim 12, further including the step of providing a vent at the distal end of the liner to allow for any air trapped in the liner to escape as the bladder is everted into the liner.

20. The method for trenchless rehabilitation of claim 12, further including the step of making an opening in the end of the liner to insure that a vacuum does not form in the liner as the bladder is de-everted and removed.

21. The method for trenchless rehabilitation of claim 12, further including the step of maintaining a constant pressure head on the expanding bladder as the bladder everts.

22. An eversion apparatus and starter sleeve assembly for use in the installation of a flexible cured in place liner in an existing pipeline, comprising:

a substantially rigid tubular member having an inlet opening and an outlet opening, a flexible tubular bladder fed through the tubular member and folded back over the outlet opening, and a flexible starter sleeve secured to the folded over bladder at the outlet opening section whereby the assembled eversion apparatus and starter sleeve is adapted to be positioned at one end of the liner for insertion of the starter sleeve into the liner prior to the eversion of the bladder.

23. The assembly of claim 22, wherein the tubular member includes an eversion fluid inlet port for receiving eversion fluid to evert the bladder through the starter sleeve into the liner.

24. The assembly of claim 22, further including a down tube secured to the eversion apparatus and a sight tube is attached to the tubular member to allow viewing the level of fluid in the downtube and bladder.

25. An eversion apparatus and starter sleeve assembly for use in the installation of a flexible cured in place liner in an existing pipeline, comprising:

a substantially rigid tubular elbow having a vertical section and a horizontal section substantially perpendicular to each other, a flexible tubular bladder fed through the vertical section to horizontal section and folded back over the horizontal section, and a flexible starter sleeve secured to the folded over bladder at the horizontal section whereby the assembled elbow and starter sleeve is adapted to be positioned at one end of the liner for insertion of the starter sleeve into the liner prior to the eversion of the bladder.

26. The assembly of claim 25, wherein the elbow includes an eversion fluid inlet port for receiving eversion fluid to evert the bladder through the starter sleeve into the liner.

27. The assembly of claim 25, further including a down tube secured to the vertical section of the elbow and a sight tube attached to the elbow to allow viewing the level of fluid in the downtube and bladder.

28. A method for trenchless rehabilitation of an existing pipeline by pulling a flexible resin impregnated liner into the existing pipeline from a first access opening to a second access opening and everting a flexible inflation bladder into the pulled in liner to conform the liner to the existing pipeline and curing the resin in the liner, comprising:

providing a supply of flexible resin impregnated liner in a length in excess of the pipeline to be repaired;

pulling the leading end of the flexible liner into the pipeline from one of the access opening to the other access opening with the leading end extending beyond the end of the pipeline in the second access opening and cutting the liner to extend a desired length into the first access opening;

providing an eversion apparatus having a tubular portion and a rigid outlet portion, the tubular portion of sufficient length to provide a required pressure head for everting a flexible inflation bladder;

providing a supply of flexible inflation bladder in a length in excess of the pipeline to be repaired and feeding the inflation bladder through the tubular portion of the eversion apparatus and turning back the end of the inflation bladder about the outlet portion and securing the bladder thereto;

securing a length of flexible starter sleeve about the secured bladder at the end of the outlet portion;

positioning the eversion apparatus with attached inflation bladder and starter sleeve at one end of the liner in one access opening facing the end of the liner;

placing the flexible starter sleeve into the end of the liner extending into the first access opening now the proximal opening;

introducing an eversion fluid into the bladder at the elbow to force the bladder out from of the outlet portion and into the interior of the flexible liner;

controlling the speed of eversion of the bladder into the liner by the introduction of eversion fluid and tension maintained on the bladder until the progressively everting bladder extends to the opposite end of the flexible liner into the other access opening, now the distal opening;

allowing the resin in the liner to cure;

removing the inflation bladder and the eversion fluid from the interior of the bladder as the bladder is de-everted and recovering the eversion fluid for reuse and storing the bladder for reuse; and removing the end of the cured liner extending beyond the length of the pipeline to be repaired into the distal access opening.

* * * * *